United States Patent [19]
Thompson et al.

[11] Patent Number: 5,257,651
[45] Date of Patent: Nov. 2, 1993

[54] FUEL RECOVERY PUMP AND REGISTER

[75] Inventors: Thomas A. Thompson, Spring Lake; Delos J. Loomis, Muskegon, both of Mich.

[73] Assignee: Bennett Pump Company, Muskegon, Mich.

[21] Appl. No.: 834,940

[22] Filed: Feb. 13, 1992

[51] Int. Cl.⁵ .............................................. B65B 3/04
[52] U.S. Cl. ........................................ 141/65; 141/84; 141/392
[58] Field of Search ................. 141/65, 392, 225, 207, 141/7, 84

[56] References Cited

U.S. PATENT DOCUMENTS

| | | | |
|---|---|---|---|
| 3,754,580 | 8/1973 | Perry | 141/65 |
| 3,996,978 | 12/1976 | Rapaelian | 141/285 |
| 4,141,393 | 2/1979 | Mayer | 141/225 X |
| 4,157,104 | 6/1979 | Lofquist, Jr. | 141/392 |
| 4,182,385 | 1/1980 | Williamson | 141/65 |
| 4,295,504 | 10/1981 | Hasselmann | 141/292 |
| 4,793,386 | 12/1988 | Sloan | 141/65 |
| 4,846,447 | 7/1989 | Hanna | 141/392 X |

Primary Examiner—Ernest G. Cusick
Attorney, Agent, or Firm—Price, Heneveld, Cooper, DeWitt & Litton

[57] ABSTRACT

An apparatus for withdrawing the fuel form the fuel tank of a liquid fuel powered vehicle and discharging the fuel into bulk storage tanks includes a pump that is selectively actuatable for pumping liquid fuel and having an inlet that is connected with a hose having a portion of sufficient length and flexibility to be inserted into the fuel tank of a vehicle. The hose is adapted to extend through the vehicle's filler pipe to the bottom of the tank. The pump has a liquid discharge conduit for connection to a fuel storage tank. A fuel meter is provided that is adapted to measuring the quantity of liquid being discharged by the pump into the discharge conduit. The hose may include a shutoff valve, which may be an automatic shutoff valve of the type used at gasoline stations.

14 Claims, 1 Drawing Sheet

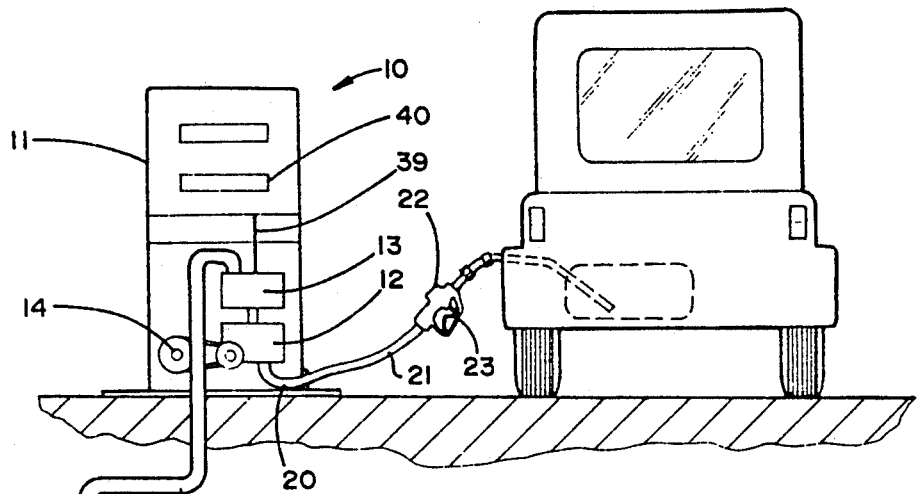
FIG. 1
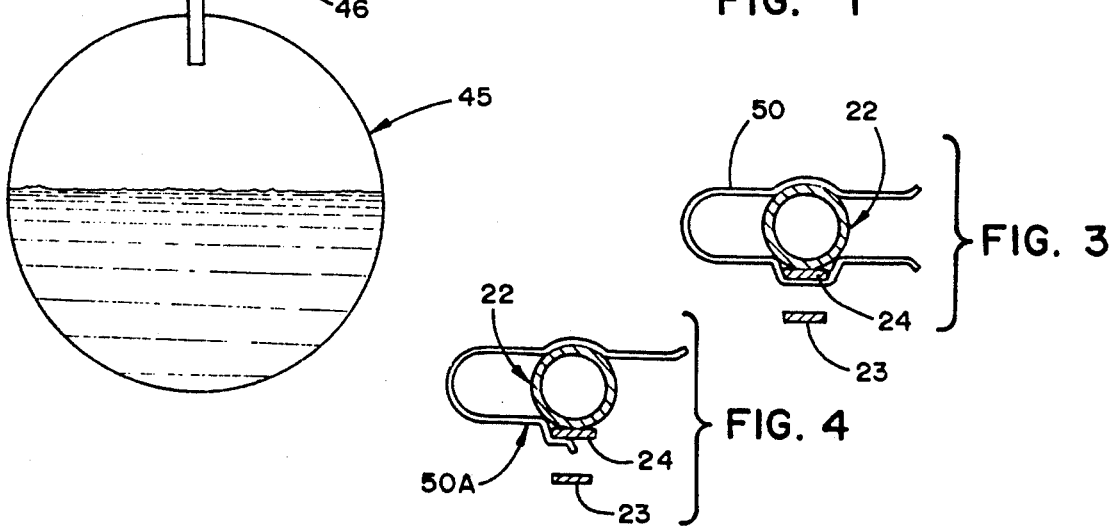
FIG. 3
FIG. 4
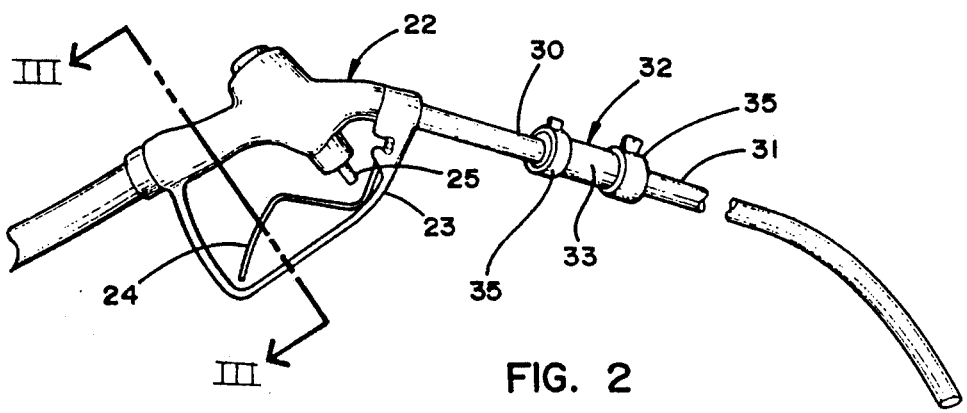
FIG. 2

FUEL RECOVERY PUMP AND REGISTER

SUMMARY OF THE INVENTION

The invention provides a metering pump for liquid fuel, such as gasoline or diesel fuel, capable of pumping the fuel out of the tanks of individual vehicles, measuring the quantity so removed, and discharging the fuel into bulk storage tanks, such as those used at fuel dispensing stations, ready for use in other vehicles The invention is particularly designed for use in connection with facilities wherein the number of vehicles requiring fuel removal is sufficiently large to justify providing special equipment for that purpose.

BACKGROUND OF THE INVENTION

Throughout the United States, there are a number of facilities having, as their business, the rental of various types of vehicles. These vehicles are operated for a definite period of time, such as one or two years, and disposed of by suitable means, such as being auctioned or offered to the public at special sales. These vehicles will be withdrawn from rental service and prepared for sale. Part of this preparation is to largely or completely empty their fuel tanks. These tanks normally have a significant amount of fuel in them. This is particularly true of vehicles that are withdrawn from active use after their last scheduled run, which may have been short, but which started the run with a full tank. Another practice common to the vehicle rental field is that of filling the tank and charging the customer for the fuel required to do this as part of the cost of renting the vehicle. Heretofore, the problem of removing the fuel has been a problem. Normally handled by providing a mobile unit which withdraws the fuel from the tanks of the vehicles and when this task is complete or the tank of the recovery vehicle is full, the fuel is disposed of by returning it to one of the bulk storage tanks connected with the facility's fuel dispensing equipment. These facilities usually do not have any means of measuring the quantity of fuel so recovered and returned to the system. Further, they have no means of providing a record of how much fuel is recovered from any particular vehicle or any record of the total amount of fuel that is sb recovered. This is important information, particularly in ascertaining the profitability or lack of profitability of the car rental operation. It is the object of this invention to provide a simple and effective means of removing the fuel from the tanks of the individual vehicles and of measuring and recording the quantities thus recovered.

BRIEF DESCRIPTION OF THE INVENTION

The invention provides a fuel pumping and metering unit very similar to that which is used in the ordinary gasoline dispensing station except that it is capable of withdrawing fuel from the tanks of vehicles which are to be taken out of service and defueled, measuring the quantity so removed and returning the recovered fuel to the bulk tank or tanks of the facility utilizing the invention. As the fuel is pumped out of the vehicle's tank and passed through the equipment, the volume of the fuel is measured and recorded. If the equipment is of the simple type the only measurement would be a totalizing of the gallonage passing through the pump between readings of the meter. This, of course, would provide a summary of the amount of fuel recovered but would not provide any information as to the quantity recovered from each vehicle. More sophisticated equipment could be provided, within the teachings of this invention, which would provide information as to the particular quantities recovered from each vehicle This information, however, is normally not necessary. The equipment may utilize the ordinary, simple hose nozzle without an automatic shutoff of the type used in gasoline stations. When the fuel from a particular vehicle has been withdrawn, this valve or nozzle is closed so that the pipe leading from the nozzle to the pump remains full. This nozzle is also equipped with a flexible hose-like extension which can pass through the filler pipe of the vehicle's tank and into the fuel tank to empty it. The pump within the measuring unit is so designed that it sucks the fuel through the nozzle to the pump rather than discharging the fuel from the pump through the nozzle.

BRIEF DESCRIPTION OF THE DRAWINGS

FIG. 1 is an elevation view, partially in section, of the invention in operation for withdrawing fuel from a vehicle fuel tank;

FIG. 2 is a enlarged detailed view of the nozzle and extension for entering the tank;

FIG. 3 is a sectional elevation view taken along the plane III—III of FIG. 2; and FIG. 4 is a sectional elevation view taken on the same plane as FIG. 3 but illustrating a modified construction.

DESCRIPTION OF THE PREFERRED EMBODIMENT

Referring to FIG. 1, it will be observed that a fuel pump 10 having a housing 11, a pump 12 and a fuel recording meter 13 are provided. These are illustrated as mounted in a conventional service station fuel pump housing from which the lower panel has been removed to expose the pump and the meter. The pump is powered by an electric motor 14. The power source for the motor and the conventional safety equipment associated with it an its electrical supply because it is used with a hazardous material are not illustrated since they are well-known and are not a part of this invention. The pump 12 is of the self-priming type and has means for separating air from the fuel. These facilities also are conventional equipment for fuel pumps of this type normally used in service stations and, therefore, are not illustrated.

The pump receives the fuel to be pumped through the pipe 20 to which is attached a conventional hose 21 of the type normally used in service stations. At its free end, the hose 21 is equipped with a nozzle 22 having a handle 23 which operates a valve within the nozzle when an operator clamps the nozzle's lever 24 to depress the valve stem 25 and open the valve. This construction is conventional and well-known in the fuel dispensing art.

Attached to what would otherwise be the open end 30 of the nozzle is a length of flexible hose 31. These nozzles are normally of a diameter such that they will just pass through the restricted entrance to the filler pipe for the gas tanks of presently available automobiles. Thus, any hose-like extension for such a nozzle must either be fitted into the end of the nozzle or a special adapter 32 must be provided. Preferably, the adapter is designed to be telescoped over the open end of the nozzle to avoid severe restriction of the capacity of the nozzle to permit fuel to pass through it. Various products are on the market to accomplish this. A particularly simple solution to this problem is a short length or splice 33 of petroleum resistant hose which will snugly slide over the end of the nozzle 30 and also telescopically seat over the end of the extension hose 31 to be used in the tank. This extension hose cannot have an outer diameter greater than that of the nozzle because it must pass through the restricted entrance to the fuel tank. The hose section 33 can be clamped to both the nozzle 30 and the extension hose 31 by suitable clamps 35 which, when tightened, provide fuel tight joints. If a more positive seal is needed or a more positive anchor is desired, a gasket forming sealant may be used between the hose section 33 and both the nozzle 30 and the extension hose 31.

The extension hose 31 has to be long enough to reach the bottom of the fuel tank. It also must be capable of maintaining its cross-sectional shape when subjected to the negative pressure necessary to withdraw the fuel from the tank and deliver it to the pump 12. At the same time, it must be flexible enough to be able to conform to the shape of the filler pipe for the fuel tank without forming kinks which would obstruct or block fuel passage through it.

The fuel withdrawn from the vehicle's tank is passed by the pump through the meter 13 and the information thereby obtained is transmitted electrically through the line 39 to the display panel 40. The equipment of which the display panel is part will also keep a running total of all the fuel which passes through it. Thus, an operator, having either zeroed the pump's recorder or logged the accumulated gallonage total can then empty the tanks of all of the vehicles of an entire fleet and simply record the total fuel recovered. He can also record the total fuel recovered from each vehicle, in the same manner as each sale at a service station is recorded, if such information is needed.

The fuel, after passing through the meter 13, is returned to one of the large storage tanks 45 by suitable conduit means 46. For this purpose, the housing 11 and pump 12, conveniently, should be located in proximity to a fuel storage tank.

To free the operator during the pumping of the fuel, a clamp 50 may be provided which will hold the nozzle's valve open, leaving the operator free to do other tasks while the fuel is being pumped. The clamp illustrated in FIG. 3 would require the operator to be prepared to remove the clamp when the vehicle's tank had been drained. If the resilience of the clamp 50 is not great enough to reopen the valve after the nozzle had sensed a lack of fuel and closed the nozzle, the arrangement illustrated in FIG. 3 need not be monitored by the operator. To adapt the automatic shutoff to a system in which the attention of the operator is not necessary to monitor the valves closure, the clamp 50a (FIG. 4) can be used which will permit the closure of the valve to release the lever 24 entirely. Upon closing actuation of the lever, it will pivot the clamp to a release position. The clamp 50a can be secured to the nozzle by a short length of line to prevent it from being lost following release. It will be recognized that other arrangements can be made to free the user from the necessity for constant monitoring of the valve during fuel recovery. Thus, various devices can be used for this purpose and the clamp 50, as it appears in FIGS. 3 and 4, is merely illustrative.

If the fleet operation includes vehicles designed to operate on a fuel other than gasoline, such as diesel fuel, a separate pump, hose and meter will be provided for this purpose. This facility will be located adjacent a source of such fuel. This would be true of a truck tractor fleet facility where the fuel is normally diesel and the tractor tanks are large and could contain substantial quantities of unused fuel. Irrespective of whether this arrangement is used for gasoline or diesel fuel, the sensor to triggering release of the lever 24 must be one which is tripped by air being withdrawn from the vehicle's fuel tank rather than a sensor which detects a fuel tank at the discharge end of the hose.

It will be recognized that this invention will not entirely empty the vehicle's fuel tank. This does not detract from the invention because a small quantity of fuel will be needed to permit engine operation to move the vehicle to a location for display or loading or the like as part of the disposal operation. While convenient, it is not necessary that the fuel removed from the tanks of the vehicles be measured electronically. A pump equipped with a mechanical volume measuring and registering device can be used. This will normally be slower but will provide the information needed for necessary records. Such devices will normally be less expensive and, therefore, more appropriate for smaller operations. However, the principle function of recovering the fuel, measuring the amount recovered and returning it to storage for later use will be retained.

The invention provides a convenient and effective means of emptying the fuel tanks of vehicles which are being retired from active service. By using it, the labor cost in emptying the tanks of vehicles being retired from service is materially reduced. Further, the equipment is such that it can always be ready and available and requires no special preparation. Also, it uses standard components which reduce both initial and maintenance costs.

Having described a preferred embodiment of my invention, it will be recognized that modifications thereof can be made. Such modifications are to be considered as included in the hereinafter appended claims unless these claims, by their language expressly state otherwise.

We claim:

1. An apparatus for withdrawing the fuel from the fuel tank of a liquid fuel powered vehicle for the purpose of draining the tank comprising: a pump, said pump having a liquid discharge conduit connectable to an inlet pipe for a liquid fuel storage tank, a fuel meter for recording the quantity of liquid being discharged by said pump into said discharge conduit, said pump having an inlet, a hose having one end connected to said inlet, said hose having a valve at its other end, a flexible hose-like extension secured to said valve for insertion into the fuel tank of a vehicle for withdrawing fuel from the fuel tank of the vehicle.

2. The apparatus described in claim 1 wherein said hose-like extension is long enough to reach the bottom of the tank.

3. The apparatus described in claim 1 wherein said hose-like extension has walls which will not collapse inwardly when sufficient pressure reduction is applied to its interior to withdraw the liquid from the tank and supple enough to be inserted into the tank, said hole-like extension having an open end that is caused to rest on the bottom of the tank.

4. An apparatus for withdrawing the fuel from the fuel tank of a liquid fuel powered vehicle for the purpose of draining the tank comprising: a pump, said pump having a liquid discharge conduit connectable to an inlet pipe for a liquid fuel storage tank, a fuel meter for recording the quantity of liquid being discharged by said pump through said discharge conduit, said pump having an inlet, a hose having one end connected to said inlet, said hose having a valve intermediate its ends, a flexible tubular extension secured to the other end of said hose for insertion into the fuel tank of a vehicle for withdrawing fuel from the fuel tank of the vehicle.

5. The apparatus described in claim 4 wherein said tubular extension is long enough to reach the bottom of the tank.

6. The apparatus described in claim 4 wherein said tubular extension has walls which will not collapse inwardly when sufficient pressure reduction is applied to its interior to withdraw the liquid from the tank and supple enough to be inserted into the tank, said tubular extension having an open end caused to rest on the bottom of the tank.

7. An apparatus for withdrawing the fuel from the fuel tank of a liquid fuel powered vehicle for the purpose of draining the tank comprising: a pump, said pump having an inlet, a hose having one end connected to said inlet, the other end of said hose having a portion long enough to be inserted into the vehicle's fuel tank through the filler pipe of the tank and extend to the bottom of the tank, a valve in said hose for interrupting the flow of liquid therethrough, said pump having a liquid discharge conduit connectable to the inlet pipe for a liquid fuel storage tank, and a fuel meter for recording the quantity of liquid being discharged by the pump into said discharge conduit.

8. An apparatus for withdrawing the fuel from the fuel tank of a liquid fuel powered vehicle for the purpose of draining the tank comprising: a pump, said pump having an inlet, a hose having one end connected to said inlet, the other end of said hose having a portion of sufficient length and flexibility to be inserted through the filler pipe of the tank into the vehicle's fuel tank and extend to the bottom thereof, a valve in said hose for interrupting the flow of liquid therethrough, and a fuel meter for recording the quantity of liquid being discharged by the pump into said discharge conduit.

9. The apparatus described in claim 8 wherein said hose has a standard service station fuel dispensing nozzle and said valve is located therein, and said fuel tank insertable hose is connected to the end of said nozzle through which fuel is normally dispensed whereby the fuel passes through said nozzle in a direction opposite to that of its flow when the nozzle is used to fill the vehicle's fuel tank.

10. An apparatus for withdrawing the fuel from the fuel tank of a liquid fuel powered vehicle for the purpose of draining the tank comprising:
a pump for pumping liquid fuel, said pump having an inlet and a liquid discharge conduit, said discharge conduit connectable to the inlet pipe of a liquid fuel storage tank;
a hose having one end connected to said inlet and a portion of sufficient length and flexibility to be inserted into the vehicle's fuel tank through the filler pipe of the tank and extend to the bottom of the tank; and
a fuel meter that is adapted to measuring the quantity of liquid being discharged by the pump into said discharge, conduit.

11. The apparatus described in claim 10 wherein said pump has a standard service station fuel dispensing nozzle and said hose is connected to the end of said nozzle through which fuel is normally dispensed whereby the fuel passes through said nozzle in a direction opposite to that of its flow when the nozzle is used to fill vehicle fuel tanks.

12. The apparatus in claim 10 wherein said fuel meter is adapted to recording accumulated amounts of fuel of an entire fleet of liquid fuel-powered vehicles.

13. The apparatus in claim 10 wherein said hose has walls which will not collapse inwardly when sufficient pressure reduction is applied to its interior to withdraw the liquid fuel from the tank.

14. The apparatus in claim 10 wherein said fuel meter provides information regarding the measured quantity of liquid electrically for use in logging recovered fuel.

* * * * *

UNITED STATES PATENT AND TRADEMARK OFFICE
CERTIFICATE OF CORRECTION

PATENT NO.  : 5,257,651
DATED       : November 2, 1993
INVENTOR(S) : Thomas A. Thompson and Delos J. Loomis It is certified that error appears in the above-indentified patent and that said Letters Patent is hereby corrected as shown below:

Title page, item [57],
In the Abstract, line 1:
  "form" should be --from--.

Column 1, line 10:
  After "vehicles" insert --.--.

Column 1, line 45:
  "is sb" should be --is so--.

Column 2, line 4:
  After "vehicle" insert --.--.

Column 4, line 63, claim 3:
  "hole-like" should be --hose-like--.

Signed and Sealed this

Twenty-eighth Day of June, 1994

Attest:

BRUCE LEHMAN

*Attesting Officer*　　　　*Commissioner of Patents and Trademarks*